(12) United States Patent
Treat et al.

(10) Patent No.: US 8,108,423 B2
(45) Date of Patent: Jan. 31, 2012

(54) SYSTEM AND METHOD FOR ONTOLOGY AND RULES BASED SEGMENTATION ENGINE FOR NETWORKED CONTENT DELIVERY

(75) Inventors: Sean T. Treat, Winter Garden, FL (US); Christopher B. Savory, Winter Garden, FL (US); Brandon D. Kolasinski, Winter Garden, FL (US); Richard George Webby, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 643 days.

(21) Appl. No.: 12/286,949

(22) Filed: Oct. 3, 2008

(65) Prior Publication Data

US 2010/0088344 A1 Apr. 8, 2010

(51) Int. Cl.
*G06F 17/30* (2006.01)
(52) U.S. Cl. ...................................................... 707/771
(58) Field of Classification Search .................. None
See application file for complete search history.

(56) References Cited

U.S. PATENT DOCUMENTS

| | | | |
|---|---|---|---|
| 2008/0294622 A1* | 11/2008 | Kanigsberg et al. | 707/5 |
| 2009/0112838 A1* | 4/2009 | Eggebraaten et al. | 707/5 |
| 2010/0070517 A1* | 3/2010 | Ghosh et al. | 707/758 |

* cited by examiner

*Primary Examiner* — Belinda Xue
(74) *Attorney, Agent, or Firm* — Farjami & Farjami LLP

(57) ABSTRACT

There is provided a system and method for an ontological and rules based segmentation engine for networked content delivery. There is provided a segmentation engine for use by a network accessible computing device providing customized content for a user on the network, comprising a user context regarding the user, a content management system for storing content, a controlled vocabulary categorizing content, an ontology using the controlled vocabulary for referencing the content of the content management system, segment definitions grouping users into segments matching content types to controlled vocabulary elements, segment rules using user context to associate with segment definitions, and a segmentation processor. The segmentation processor can receive a content request from the user, and by using the elements of the segmentation engine, determine the segment definitions applicable to the user and provide customized content from the content management system. The segment definitions are readily modifiable without detailed low-level knowledge.

12 Claims, 4 Drawing Sheets

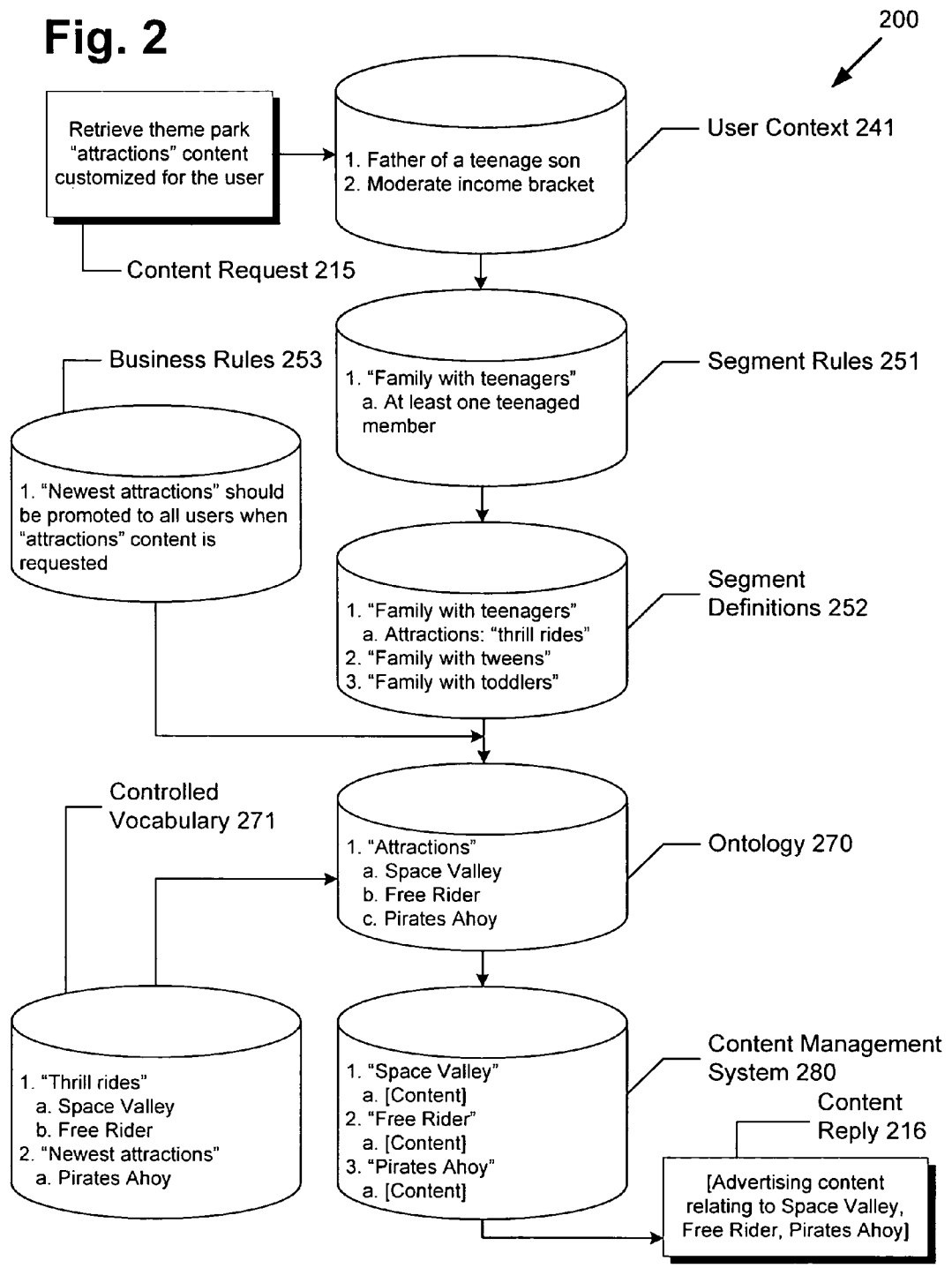

| Be sure to visit "Pirates Ahoy", our newest attraction!<br><br>Zero gravity thrills in "Space Valley"!<br><br>Experience the 100 meter free fall of "Free Rider"! | Thank you for requesting a vacation quote. Based on the information you have provided, we recommend the following packages:<br><br>Package A: Click for info...<br>   3 days / 4 nights<br>   Meal plan included<br>   The Phoenix Hotel<br><br>Package B: Click for info...<br>   5 days / 6 nights<br>   No meal plan<br>   The Moonlight Hotel | We have exclusive offers from our partners to better serve you:<br><br>Discounted flights – Reserve Now!<br><br>Vehicle Rentals Free gas credit! |

Frame 390a     Frame 390b     Frame 390c

SYSTEM AND METHOD FOR ONTOLOGY AND RULES BASED SEGMENTATION ENGINE FOR NETWORKED CONTENT DELIVERY

BACKGROUND OF THE INVENTION

1. Field of the Invention

The present invention relates generally to computer systems. More particularly, the present invention relates to systems for processing of computer data.

2. Background Art

Providing personalization over networked sites on the Internet is a common technique for leveraging the data mining capabilities of computers, providing a highly relevant browsing experience for users. By presenting customized content that a user is likely to be interested in, user attention can be sustained for longer periods of time. In the context of e-commerce, this allows increased opportunities to market products and follow through with sales. Some prominent examples include product recommendations based on previous purchases and browsing habits, and targeted banner ads based on the content of searches or requested websites.

Besides individualized personalization, there is also the technique of segmenting users into distinct categories, each category having a different marketing focus and approach. These categories might be defined by numerous segmentation rules, which may be based on browsing behaviors, demographics, social networks, lifestyles, personal interests, and other information. For example, a video games reseller might categorize users as "core gamers," "casual gamers," "music gamers," and "family gamers." Rules might thus be constructed based on volunteered user profile information or tracked user behavior. For example, users might be categorized as "core gamers" if they previously purchased several games in traditional game genres such as fighting and shooting games. "Casual gamers" may have less frequent buying activity and dabble in a wider range of game genres. "Music gamers" might indicate that they also play musical instruments and have an interest in music simulation games. "Family gamers" might indicate that they primarily purchase video games for their children, and are looking for appropriately rated selections. Once the video games reseller e-commerce site determines a user match to one or more particular categories, site content, recommendations, and marketing copy can be presented to the user accordingly.

To best meet changing business needs and demands, it is essential to quickly reinvent marketing strategies to keep abreast of new trends and market conditions. Optimization of customer segmentation methodologies is one essential part of this constant reinvention procedure. However, this optimization step has traditionally required skilled information technology staff to embark on expensive and time-consuming projects to modify complex marketing and commerce systems. Frequent and cost-effective optimization of customer segmentation methodologies could be readily achieved if marketing and sales staff were enabled to easily modify segments and content presentation without requiring reprogramming of systems code.

Accordingly, there is a need to overcome the drawbacks and deficiencies in the art by providing a way to segment users into categories for customized content in a networked content delivery system without requiring detailed knowledge of low-level architectural and implementation details to affect system changes.

SUMMARY OF THE INVENTION

There are provided systems and methods for an ontological and rules based segmentation engine for networked content delivery, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 presents a diagram demonstrating the data flow of content requests in an ontological and rules based segmentation engine for networked content delivery, according to one embodiment of the present invention;

FIG. 3 presents an example display presented to a user interacting with a server using an ontological and rules based segmentation engine for networked content delivery, according to one embodiment of the present invention.

DETAILED DESCRIPTION OF THE INVENTION

The present application is directed to a system and method for ontology and rules based segmentation engine for networked content delivery. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
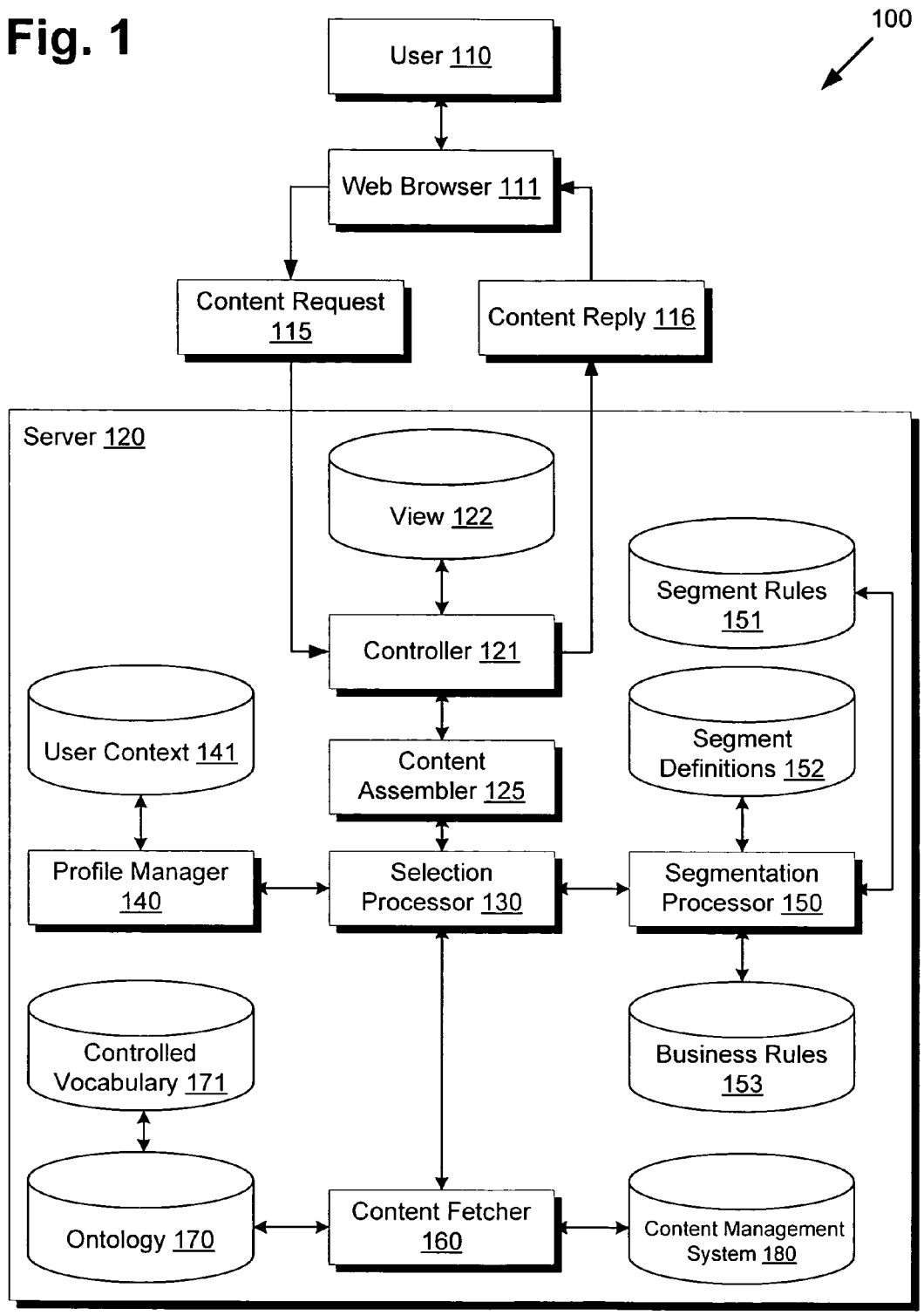
FIG. 1 presents a network diagram for supporting an ontological and rules based segmentation engine for networked content delivery, according to one embodiment of the present invention.

FIG. 1 presents a network diagram for supporting an ontological and rules based segmentation engine for networked content delivery, according to one embodiment of the present invention. Network environment 100 includes user 110, web browser 111, content request 115, content reply 116, and server 120. Server 120 includes controller 121, view 122, content assembler 125, selection processor 130, profile manager 140, user context 141, segmentation processor 150, segment rules 151, segment definitions 152, business rules 153, content fetcher 160, ontology 170, controlled vocabulary 171, and content management system 180. A network such as the Internet provides communications services to the components of network environment 100.

User 110 may represent a customer shopping on the Internet through Hypertext Transfer Protocol (HTTP) web browser 111. Thus, user 110 might access the site hosted by server 120 via web browser 111. Web browser 111 thus sends content request 115 to server 120 to request the content to display on web browser 111. Controller 121 of server 120 receives content request 115 and processes it until a suitable content reply 116 is sent back to web browser 111.

Server 120 comprises components that are designed to process content request 115 to return an appropriate corresponding content reply 116. In the diagram shown in FIG. 1, server 120 is configured as a HTTP server, for hosting an e-commerce web site to be accessed by the public via the Internet. Although other network applications besides e-commerce could benefit from the segmentation engine presented in FIG. 1, such as generalized content delivery systems and marketing sites, e-commerce shall be the focus of this application, more specifically an e-commerce site offering travel booking and associated arrangements. Additionally, althoug server 120 is configured as a HTTP server, alternative embodiments may use alternatives to the HTTP protocol. For example, Simple Object Access Protocol (SOAP), Java remote method invocation (RMI), and other mechanisms to support data communication may be utilized, although such mechanisms may also use HTTP protocols as an application layer for compatibility with the widespread HTTP infrastructure of the Internet.

In FIG. 1, various data processing steps have been modularized into specialized components and data stores. Although the components of server 120 are depicted as belonging to a single server for clarity, alternative embodiments may separate the components of server 120 into multiple servers. For example, there may be specialized servers for handling specific components, such as a dedicated segmentation server with only segmentation processor 150, segment rules 151, and segment definitions 152. Data stores, such as user context 141, may be placed in dedicated storage servers. Additionally, there might be multiple servers so that the computing workload can be balanced among several servers rather than just a single server, allowing several users to be serviced concurrently. However, for the purposes of the present example, a single server shall service all user content requests.

It should be noted that server 120 only represents one possible configuration that can acceptably process content request 115 to produce content reply 116. Alternative embodiments might include additional components, consolidate multiple components into a single unit, or omit certain components that are not essential. Additional components might include an external profile manager, allowing access to user contexts from different domains to take into consideration user behavior from other sites. Omitted components might include controller 121, which implements the model-view-controller framework in server 120. Since the particular model-view-controller design of FIG. 1 is only one method of implementing server 120, an alternative design may render controller 121 unnecessary. Alternatively, the functions of controller 121 might be integrated into other components. For example, client-side code running on web browser 111 might handle view and controller duties.

Proceeding from order of data processing, controller 121 first parses content request 115, matches it with an appropriate view template from view 122, and further passes a request for matching model data to content assembler 125. Thus, controller 121 operates to apply the model-view-controller (MVC) framework in the design of server 120. This allows the abstraction and separation of the interface layer, or controller 121, and the presentation layer, or view 122, from the actual data content, or model, which will be eventually retrieved from content management system 180. Controller 121 handles processing of input from user 110, such as mouse clicks or keyboard entry. View 122 allows flexible presentation of a user interface by hosting multiple view templates displaying the same user interface in different ways. For example, one view template can use a larger font, whereas another view template can present a shrunken user interface, omitting bandwidth intensive graphics and videos. The larger font may be appreciated by vision impaired users, whereas the shrunken interface may be especially suitable for portable Internet access devices such as smartphones or compact notebook computers, which often have a limited viewing area and limited bandwidth to the Internet. Abstracting and separating in this manner thus allows view 122 or controller 121 to be modified without requiring knowledge of the other, reducing complexity and compartmentalizing development.

Next, content assembler 125 parses the model data request from controller 121, preparing a model object populated with the requested data to be returned to controller 121. Since a user interface presented on web browser 111 may contain several distinct modules that require content, content assembler 125 may send multiple content requests to selection processor 130 for each module requesting content. For example, a user interface might be split into three columns, with a central frame displaying the main content requested by user 110, a left frame displaying content related to the main content, and a right frame displaying related advertisements. In this case, content assembler 125 will process each module and send requests to selection processor 130 for retrieving content with a specified content type, such as the main content, the related content, and the advertising content.

Selection processor 130 may then query profile manager 140, which manages the user context 141 data store. Within user context 141, gathered data concerning user 110 is stored for analysis and decision making within server 120. This gathered data may include user behavioral analysis of user 110, such as previously requested content and interactions with the user interface presented by server 120, user volunteered information such as text entered into query boxes or clicked elements, and other variables such as user time spent viewing particular pages. This information can be gathered without requiring user registration by tracking users using methods such as Hypertext Transfer Protocol (HTTP) cookies, which allows web browser 111 to be assigned a unique identifier. Additionally, as previously mentioned, an additional external profile manager might also provide insights to user behavior on other domains, made possible by a mechanism such as third-party HTTP cookies.

If user 110 decides to register with server 120 and provide personal details such as name, address, telephone, and other demographic information, this registration information can be associated within user context 141 as well. Past purchases and other historical data associated with the registered account can also comprise relevant data for user context 141. However, registration is not required, as server 120 can still operate strictly on an anonymous basis by using only a unique identifier to link user 110 and user context 141. The unique identifier can simply be a random number with no personally identifiable information, allowing user 110 to remain anonymous but still discernable from other users.

Although FIG. 1 only shows one user context 141, profile manager 140 may also access other user context data stores for each uniquely tracked user. For the purposes of FIG. 1, only user context 141 directly related to user 110 is utilized. However, alternative embodiments might access multiple user contexts related to other users for taking into consideration the influence of family, friends, and other users in segmentation and customization.

After interacting with profile manager 140, selection processor 130 can couple the data retrieved from user context 141 with the content requests and content types from content assembler 125 for transmission to segmentation processor 150. At segmentation processor 150, user context 141 can be parsed through segment rules 151 to categorize user 110 within one or more categories, or segments, defined by segment definitions within segment definitions 152. In turn, each of the matched segments within segment definitions 152 can be matched to the content types received from selection processor 130 to determine controlled vocabulary elements that also exist as a part of controlled vocabulary 171 of ontology 170. Furthermore, these controlled vocabulary elements may be further customized or overridden using business rules 153, which may function to enforce certain global constraints or rules. Business rules 153 can add a further layer of user customization that is independent of segmentation.

Once selection processor 130 determines the controlled vocabulary elements user 110 is matched to, selection processor 130 can query content fetcher 160 to retrieve the appropriate content to display to user 110. Content fetcher 160 can search ontology 170 with the matched controlled vocabulary elements to retrieve references to actual content within content management system 180. Ontology 170 contains a set of concepts within a domain encompassed by the content contained in content management system 180, and the relationships between those concepts. For a web-based application, ontology 170 might be described using the OWL Web Ontology Language (OWL). The concepts may include groupings, attributes, relations, rules, and other knowledge regarding the content contained in content management system 180. Specifically, in FIG. 1, ontology 170 enforces the use of controlled vocabulary 171 to preserve consistent references to specific content within content management system 180. In this manner, ontology 170 can thus provide correct content references within content management system 180 when queried with associated controlled vocabulary elements.

Content fetcher 160 can now pull or obtain actual customized content from content management system 180 by using the content references from ontology 170. Although content management system 180 might provide various high level functions to manipulate and enforce constraints for content, content management system 180 should minimally support content storage and retrieval. This storage and retrieval functionality might be implemented using a database, or a high level abstraction that uses the database as a lower level access mechanism.

Once content fetcher 160 retrieves all the customized content necessary to server user 110, it can begin preparing to send a content response, which may return back to selection processor 130, back to content assembler 125, and back to controller 121. As previously discussed, content assembler 125 might convert the content into more suitable representations, and controller 121 may transform the content using view 122 to customize presentation. At controller 121, content reply 116 is generated such that web browser 111 can understand the response, where it is rendered for user 110 to view, thus completing the request and reply cycle shown in FIG. 1.

FIG. 2 presents a diagram demonstrating the data flow of a content request in an ontological and rules based segmentation engine for networked content delivery, according to one embodiment of the present invention. Since FIG. 1 has been described in generic terms without a specific example of a content request, FIG. 2 might provide a helpful guide of the data processing steps of FIG. 1 using a specific example. Data flow diagram 200 includes content request 215, content reply 216, user context 241, segment rules 251, segment definitions 252, business rules 252, ontology 270, controlled vocabulary 271, and content management system 280. Content request 215 corresponds to content request 115 from FIG. 1. Content reply 216 corresponds to content rely 116 from FIG. 1. User context 241 corresponds to user context 141 from FIG. 1. Segment rules 251 correspond to segment rules 151 from FIG. 1. Segment definitions 252 correspond to segment definitions 152 from FIG. 1. Business rules 253 correspond to business rules 153 from FIG. 1. Ontology 270 corresponds to ontology 170 from FIG. 1. Controlled vocabulary 271 corresponds to controlled vocabulary 171 from FIG. 1. Content management system 280 corresponds to content management system 180 from FIG. 1.

An example scenario might be a family planning a vacation at a theme park. The family might include one teenage son. The father might decide to visit the website of said theme park to make travel booking arrangements, associated reservations, and plan an overall itinerary. Thus, the father might be presented with a preliminary solicitation page requesting information regarding his party and desired budget, which he duly inputs. Based on this input, user context 241 is created for the father, indicating he has a teenage son and a moderate income. After this information is received, the web server might present a structured page with several modules, the main module in the center presenting various vacation packages for a family of three within the requested budget, with additional supplemental modules on the sides for providing additional information. One supplemental module might comprise a column on the left side highlighting the attractions available at the theme park that the server has determined might appeal to the user, based on an ontological and rules based segmentation engine, such as the one described in FIG. 1.

Thus, when the web browser begins rendering the left side supplemental module, the father's web browser sends content request 215 for the attractions content, as shown in FIG. 2. User context 241, describing the father, interacts with segment rules 251 to place the father in the "Family with teenagers" segment of segment definitions 252. Since content request 215 is for the content type "attractions" and segment definitions 252 indicate that "Family with teenagers" prefer "thrill rides," the "thrill rides" controlled vocabulary element is searched through ontology 270 to find appropriate content references. Ontology 270 identifies particular content as belonging to an "attractions" category type, with controlled vocabulary 271 describing controlled vocabulary elements such as "thrill rides" to specific content references such as "Space Valley" or "Free Rider."

Since the idea that a "Family with teenagers" would prefer "thrill rides" is separately encapsulated in segment definitions 252, direct modifications to ontology 270 or content management system 280 are unnecessary if evolving trends make this relationship no longer true. If, for example, "character rides" are suddenly in vogue with the teenage crowd, maybe perhaps due to the introduction of a charming new theme park character, "thrill rides" might be replaced with "character rides" instead to reflect that trend, where "character rides" is defined within controlled vocabulary 271. A friendly interface for manipulating segment definitions 252 may be developed such that non-technically inclined users can easily modify and create new segment definitions, helping to leverage the insights of industry analysts and marketing personnel. Thus, staff lacking deep technical knowledge of ontology 270 or content management system 280 can still nevertheless implement sweeping changes to the system with minimal effort, changes that may have been previously impossible without a fairly detailed understanding of the system.

Additionally, since business rules 253 indicates that "newest attractions" should be presented to all users when "attractions" are requested, the "newest attractions" controlled vocabulary element is also searched through ontology 270. Business rules 253 may contain additional global or specialized rules that are applied to all users or specific accounts. Business rules 253 can be used to provide an additional layer of customization independent of segment rules 251 and segment definitions 252.

As a result of the segmentation and the business rules, ontology 270 returns "Space Valley" and "Free Rider," or the segmented "thrill rides," and "Pirates Ahoy," or the business rule "newest attractions." Using these attraction references, actual content is retrieved from content management system 280, which might include Hypertext Markup Language (HTML) text of advertising content along with linked pictures, videos, and other data. This retrieved content is appropriately formatted as content reply 216, to be returned to the original requesting web browser to be displayed on the left side column, where the father can note that attractions "Space Valley," "Free Rider," and "Pirates Ahoy" may make his family's vacation more memorable.

FIG. 3 presents an example display presented to a user interacting with a server using an ontological and rules based segmentation engine for networked content delivery, according to one embodiment of the present invention. Browser display 300 includes frame 390a, frame 390b, and frame 390c. Browser display 300 might be shown on web browser 111 of FIG. 1, presented to user 110 interacting with server 120.

Continuing with the theme park vacation reservation example discussed with FIG. 2, browser display 300 might be presented to the father after the father submits a request for vacation package quotations. Frame 390a displays promotional advertising copy regarding attractions targeted for the father and his segment, "family with teenagers," the segmentation process as previously described in FIG. 2. Frame 390a may contain the results of content reply 216 from FIG. 2. Frame 390b displays the main content, a list of suggested vacation packages within the budget parameters specified by the father. Frame 390c displays some additional related advertisements based on the user context provided by the father. Since user context 241 of FIG. 2 indicates the father belongs to a "moderate income bracket," the promotional offers shown in frame 390c may be focus on "value conscious services" such as discounted flight tickets and free rental vehicle gas. If, however, the father instead belonged to a "high income bracket," the offers shown in frame 390c might focus on "luxury services" such as VIP lounge access or chauffeur service. The segmentation process customizing the content for frame 390c may be similar to the process for frame 390a, placing the father in a particular segment and linking that segment to appropriate content—"value conscious services" for the "moderate income bracket", and "luxury services" for the "high income bracket."

Again, since the logic for segmentation is modularized into segment definitions 252, these relationships can be flexibly edited if circumstances change. For example, if one year, the government provides especially generous tax refunds to stimulate the economy, even the "moderate income bracket" segment might be directed to "luxury services," appealing to consumers looking to indulge themselves with their tax returns. Conversely, if there is a downturn in the economy, "luxury services" might not even be shown at all, possibly preserving customer goodwill by preventing the appearance of insensitivity to the economic concerns of the public.

Although the content frames depicted in browser display 300 only show text, the content frames could also be filled with rich multimedia content such as video, audio, Flash, Silverlight, Java applets, and asynchronous Javascript and XML (AJAX) widgets. Furthermore, the simple three-column layout used in browser display 300 might be replaced with any number of different page layouts. Content may be arranged as demanded for aesthetic, consistency, and usability purposes.

Figure 4:
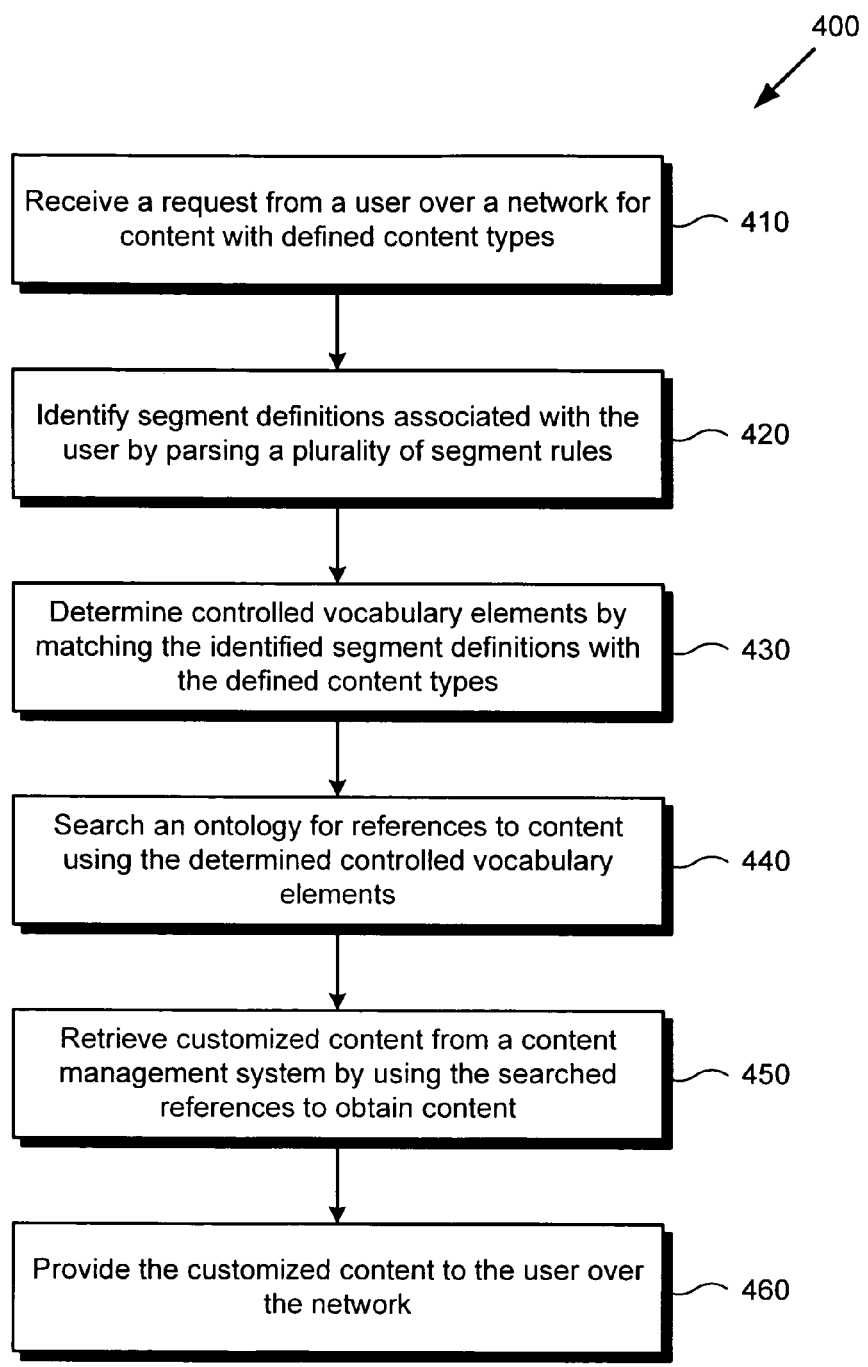
FIG. 4 shows a flowchart describing the steps, according to one embodiment of the present invention, by which a network accessible computing device can provide customized content for a user on the network using an ontological and rules based segmentation engine for networked content delivery.

FIG. 4 shows a flowchart describing the steps, according to one embodiment of the present invention, by which a network accessible computing device can provide customized content for a user on the network using an ontological and rules based segmentation engine for networked content delivery. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and network environment 100 of FIG. 1, step 410 of flowchart 400 comprises server 120 receiving content request 115 from user 110 over a network for content with defined content types. By utilizing the example data in FIG. 2 for flowchart 400, content request 115 would comprise a request for theme park attractions customized for user 110, the father of a teenage son. The defined content type in this case would be "attractions." Content request 115 would be sent by web browser 111 to be received by server 120. Controller 121 detects the input from the user that initiated the request, for example, a mouse click. It passes an unpopulated model to content assembler 125, which parses the model and queries selection processor 130 to retrieve the appropriate content to populate the model. Since content request 115 is only for one specific type of content, "attractions," content assembler 125 only needs to send out one request to populate the model.

Referring to step 420 of flowchart 400 in FIG. 4 and network environment 100 of FIG. 1, step 420 of flowchart 400 comprises server 120 identifying segment definitions from segment definitions 152 associated with user 110, the father, by parsing segment rules 151. This step is done with the help of segmentation processor 150, which also utilizes user context 141, corresponding to user 110, provided by profile manager 140. By parsing user context 141 via segment rules 151, the proper segment or segments from segment definitions 152 can be identified. Selection processor 130 negotiates communication between profile manager 140 and segmentation processor 150. Using the example data from FIG. 2, user context 141 indicates that user 110 is a "Father of a teenage son." Applying this property to segment rules 151, which indicates that a "Family with teenagers" contains "At least one teen-aged member," segmentation processor 150 can determine that user 110 should belong to the "Family with teenagers" segment definition of segment definitions 152, rather than the "Family with tweens" or "Family with toddlers" segment definitions.

Although in this particular example, user 110 is placed in the "Family with teenagers" segment definition to the exclusion of the other segments, mutual exclusivity is not a requirement and a user might belong to multiple segments, or no segments at all. For example, if user 110 also has a toddler daughter, he might also belong to the "Family with toddlers"

segment definition as well. If user 110 were an unmarried single person, then none of the segments within segment definitions 152 would apply.

Referring to step 430 of flowchart 400 in FIG. 4 and network environment 100 of FIG. 1, step 430 of flowchart 400 comprises server 120 determining controlled vocabulary elements by matching the identified segment definitions from step 420 with the defined content types from the request received from step 410. Continuing with the present example, this step would match "Family with teenagers" with "attractions" to determine that the "thrill rides" controlled vocabulary element is applicable to user 110. This relationship should be clear in segment definitions 252 in FIG. 2. Additionally, although not required, business rules 153 could also be applied at this time, causing the "Newest attractions" controlled vocabulary element to be appended to the results. These controlled vocabulary elements are passed to content fetcher 160 for further processing.

Referring to step 440 of flowchart 400 in FIG. 4 and network environment 100 of FIG. 1, step 440 of flowchart 400 comprises server 120 searching ontology 170 for references to content using the determined controlled vocabulary elements from step 430. Continuing with the present example, this step would comprise content fetcher 160 searching ontology 170 to locate references to content using "thrill rides" and optionally "Newest attractions" if business rules 153 are to be applied. Ontology 170 may utilize controlled vocabulary 171 to parse the provided controlled vocabulary elements. Examining controlled vocabulary 271 of FIG. 2, "thrill rides" includes "Space Valley" and "Free Rider," and "Newest attractions" includes "Pirates Ahoy." Thus, step 440 would retrieve references to said attractions, with "Pirates Ahoy" included only if business rules 153 are in effect.

Referring to step 450 of flowchart 400 in FIG. 4 and network environment 100 of FIG. 1, step 450 of flowchart 400 comprises server 120 retrieving customized content from content management system 180 by using the references located at step 440 to pull or obtain content. As previously discussed, this step uses content management system 180 as a storage database, retrieving content in a number of possible formats such as text, HTML, or multimedia content.

Referring to step 460 of flowchart 400 in FIG. 4 and network environment 100 of FIG. 1, step 460 of flowchart 400 comprises server 120 providing the customized content from step 450 to user 110 over the network. As previously discussed, content fetcher 160 may send the response backwards up the process chain, back to selection processor 130, back to content assembler 125, and back to controller 121, with content assembler 125 possibly applying representation conversion and controller 121 possibly applying presentation transformation using view 122. At controller 121, content reply 116 is generated such that web browser 111 can understand the response, where it is rendered for user 110 to view, thus completing step 460.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a network accessible computing device providing customized e-commerce content for a user on the network, the computing device having a segmentation engine that includes a user context containing data regarding the user, a content management system for storing an e-commerce content, a controlled vocabulary including controlled vocabulary elements categorizing the e-commerce content, an ontology using the controlled vocabulary for referencing the e-commerce content of the content management system, a plurality of segment definitions defining one or more segments, each segment definition matching content types to controlled vocabulary elements, and a plurality of segment rules for categorizing the user into the one or more segments, each segment rule relying on the user context to associate with each segment definition from the plurality of segment definitions, the method comprising:

receiving a request from the user over the network for the e-commerce content with defined content types;

identifying segment definitions associated with the user by parsing the plurality of segment rules to categorize the user into the one or more segments;

determining controlled vocabulary elements by matching the identified segment definitions with the defined content types;

searching the ontology to locate references to the e-commerce content using the determined controlled vocabulary elements;

retrieving the customized e-commerce content from the content management system by using the located references to obtain the e-commerce content; and providing the customized e-commerce content to the user over the network;

wherein the determined controlled vocabulary elements are refined by a plurality of business rules prior to searching the ontology using the determined controlled vocabulary elements.

2. The method of claim 1, wherein the user context includes past user behavior and user volunteered information.

3. The method of claim 1, wherein the computing device is a server, wherein the network is the Internet, and wherein the customized e-commerce content is provided to the user within a browser.

4. The method of claim 3, wherein the computing device uses the Hypertext Transfer Protocol (HTTP) protocol to provide the customized e-commerce content to the browser.

5. The method of claim 1, wherein the ontology is described using the OWL Web Ontology Language (OWL).

6. The method of claim 1, wherein the e-commerce content relates to travel booking and associated arrangements.

7. A network accessible computing device for providing customized e-commerce content for a user on the network, the computing device comprising:

a user context containing data regarding the user;

a content management system for storing e-commerce content;

a controlled vocabulary including controlled vocabulary elements categorizing the e-commerce content;

an ontology using the controlled vocabulary for referencing the e-commerce content of the content management system;

a plurality of segment definitions defining one or more segments, each segment definition matching content types to controlled vocabulary elements;

a plurality of segment rules for categorizing the user into the one or more segments, each segment rule relying on the user context to associate with each segment definition from the plurality of segment definitions; and a segmentation processor configured to:
- receive a request from the user over the network for the e-commerce content with defined content types;
- identify segment definitions associated with the user by parsing the plurality of segment rules to categorize the user into the one or more segments;
- determine controlled vocabulary elements by matching the identified segment definitions with the defined content types;
- search the ontology to locate references to the e-commerce content using the determined controlled vocabulary elements;
- retrieve the customized e-commerce content from the content management system by using the located references to obtain the e-commerce content; and
- provide the customized e-commerce content to the user over the network;

wherein the determined controlled vocabulary elements are refined by a plurality of business rules prior to searching the ontology using the determined controlled vocabulary elements.

8. The computing device of claim 7, wherein the user context includes past user behavior and user volunteered information.

9. The computing device of claim 7, wherein the computing device is a server, wherein the network is the Internet, and wherein the customized e-commerce content is provided to the user within a browser.

10. The computing device of claim 9, wherein the computing device uses the Hypertext Transfer Protocol (HTTP) protocol to provide the customized e-commerce content to the browser.

11. The computing device of claim 7, wherein the ontology is described using the OWL Web Ontology Language (OWL).

12. The computing device of claim 7, wherein the e-commerce content relates to travel booking and associated arrangements.

* * * * *